US012218453B2

(12) United States Patent
Kozono et al.

(10) Patent No.: US 12,218,453 B2
(45) Date of Patent: Feb. 4, 2025

(54) CONNECTOR

(71) Applicant: Yazaki Corporation, Tokyo (JP)

(72) Inventors: Seiji Kozono, Kakegawa (JP); Yoshitaka Tsushima, Fujieda (JP); Masaya Okamoto, Fujieda (JP)

(73) Assignee: YAZAKI CORPORATION, Tokyo (JP)

( * ) Notice: Subject to any disclaimer, the term of this patent is extended or adjusted under 35 U.S.C. 154(b) by 370 days.

(21) Appl. No.: 17/857,750

(22) Filed: Jul. 5, 2022

(65) Prior Publication Data

US 2023/0009521 A1    Jan. 12, 2023

(30) Foreign Application Priority Data

Jul. 7, 2021 (JP) .................................. 2021-112928

(51) Int. Cl.
*H01R 13/447* (2006.01)
*H01R 13/453* (2006.01)

(52) U.S. Cl.
CPC ....... *H01R 13/4532* (2013.01); *H01R 13/447* (2013.01); *H01R 13/453* (2013.01); *H01R 13/4536* (2013.01); *H01R 13/4538* (2013.01)

(58) Field of Classification Search
CPC ............ H01R 13/4532; H01R 13/5213; H01R 13/447; H01R 13/453; H01R 13/4536; H01R 13/4538; B60L 53/16
USPC ........................................................ 439/138
See application file for complete search history.

(56) References Cited

U.S. PATENT DOCUMENTS

| | | | |
|---|---|---|---|
| 2003/0077929 A1* | 4/2003 | Funatsu ............ | H01R 13/4532 439/137 |
| 2010/0022110 A1* | 1/2010 | Dufresne De Virel ..................... | H01R 13/5213 439/138 |
| 2013/0137290 A1* | 5/2013 | Chang ................... | G06F 1/1684 439/377 |
| 2014/0057468 A1* | 2/2014 | Temmesfeld ........ | H01R 13/639 439/133 |
| 2014/0115947 A1* | 5/2014 | Wilcox .................. | A01K 97/10 43/21.2 |

(Continued)

FOREIGN PATENT DOCUMENTS

JP     2005-80490 A      3/2005
JP     201279628 A       4/2012

*Primary Examiner* — Christopher M Koehler
*Assistant Examiner* — Gregory L Mangot
(74) *Attorney, Agent, or Firm* — Sughrue Mion, PLLC

(57) ABSTRACT

There is provided a connector including: a first connector; and a second connector. The second connector includes: a cover having a cover portion that covers a front surface opening of a first housing, a rotation shaft that rotatably supports the cover portion between a position where the cover portion covers the front surface opening and a position where the cover portion does not cover the front surface opening, and an abutted portion with which a protruding portion of the first housing abuts; and a slide mechanism that slides the rotation shaft toward the first connector in response to pressing the first housing to a second housing. After the rotation shaft is slid toward the first connector with the slide mechanism, the protruding portion presses the abutted portion such that the cover portion is rotated to the position where the cover portion does not cover the front surface opening.

3 Claims, 8 Drawing Sheets

(56) References Cited

U.S. PATENT DOCUMENTS

2018/0309222 A1* 10/2018 Ferran Palau ....... H01R 13/629
2020/0031235 A1* 1/2020 Song ........................ B60K 1/00

* cited by examiner

CONNECTOR

CROSS-REFERENCE TO RELATED APPLICATIONS

This application is based on and claims priority under 35 USC 119 from Japanese Patent Application No. 2021-112928 filed on Jul. 7, 2021, the contents of which are incorporated herein by reference.

TECHNICAL FIELD

The present disclosure relates to a connector having a cover mechanism.

BACKGROUND ART

In the related art, a wire harness (electric wire) for electrically connecting various electrical components mounted on an automobile and the like performs connection by a connector. Such a connector is usually constituted by a male connector and a female connector. Then, for example, in the case of a connector structure applied to optional specifications, one connector connected to an end portion of an electric wire disposed in advance is provided with a cover mechanism at a front opening of a housing for purposes such as dust prevention, terminal protection, prevention of electric shock to the surroundings, and the like until the other connector is fitted. In particular, in an electric vehicle and the like, a cover-mechanism-equipped connector (inlet) is applied in order to prevent an electric shock accident and the like, and exposure of a terminal at a front opening is prevented when the connector is not connected. As an example of such a configuration, JP2012-079628A discloses a charging cable connection structure, for example.

In this charging cable connection structure, a lid body (cover) that slides between a position covering a socket portion (front surface opening) and a position not covering the socket portion is provided, and the lid body is biased to the position covering the socket portion by a spring (biasing member). In addition, the lid body includes an abutted portion for abutting a side portion of a plug portion of a charging cable, and a positioning unit for determining an abutting position of the plug portion with respect to the abutted portion. The positioned plug portion is configured to face the socket portion when the lid body is slid to a position not covering the socket portion.

A user can cause the plug portion of the charging cable to face the socket portion and insert the plug portion into the socket portion by performing an operation of abutting the plug portion of the charging cable on the abutted portion and sliding the lid body.

SUMMARY OF INVENTION

However, in the charging cable connection structure disclosed in JP2012-079628A, when the lid body is slid by the plug portion of the charging cable at the time of connector fitting, the lid body slides with respect to an opening edge of the socket portion, and therefore, there is a possibility that the opening edge of the socket portion and the lid body rub against each other. In particular, when an elastic packing is provided on an inner surface of the lid body in order to reliably prevent entry of dust, water, and the like into the socket portion, wear may occur in a sliding portion of the elastic packing.

The present disclosure provides a connector which can prevent wear of a housing and a cover in a cover-mechanism-equipped connector.

According to an illustrative aspect of the present disclosure, a connector includes: a first connector; and a second connector, in which the first connector and the second connector are fitted and electrically connected to each other. The first connector includes: a first housing that houses a first connection terminal; and a protruding portion that protrudes from the first housing toward the second connector along a connector fitting direction. The second connector includes: a second housing that houses a second connection terminal and has a front surface opening to which the first connector is fitted; a cover including a cover portion that covers the front surface opening, a rotation shaft that rotatably supports the cover portion between a position where the cover portion covers the front surface opening and a position where the cover portion does not cover the front surface opening, and an abutted portion with which the protruding portion abuts; and a slide mechanism that slides the rotation shaft toward the first connector in response to pressing the first housing to the second housing. After the rotation shaft is slid toward the first connector with the slide mechanism, the protruding portion presses the abutted portion such that the cover portion is rotated to the position where the cover portion does not cover the front surface opening.

The present disclosure has been briefly described above. Details of the present disclosure will be further clarified by reading through an embodiment for implementing the invention described below (hereinafter referred to as the "embodiment") with reference to the accompanying drawings.

DESCRIPTION OF EMBODIMENTS

Hereinafter, an example of an embodiment according to the present disclosure will be described with reference to the drawings.

Figure 1:
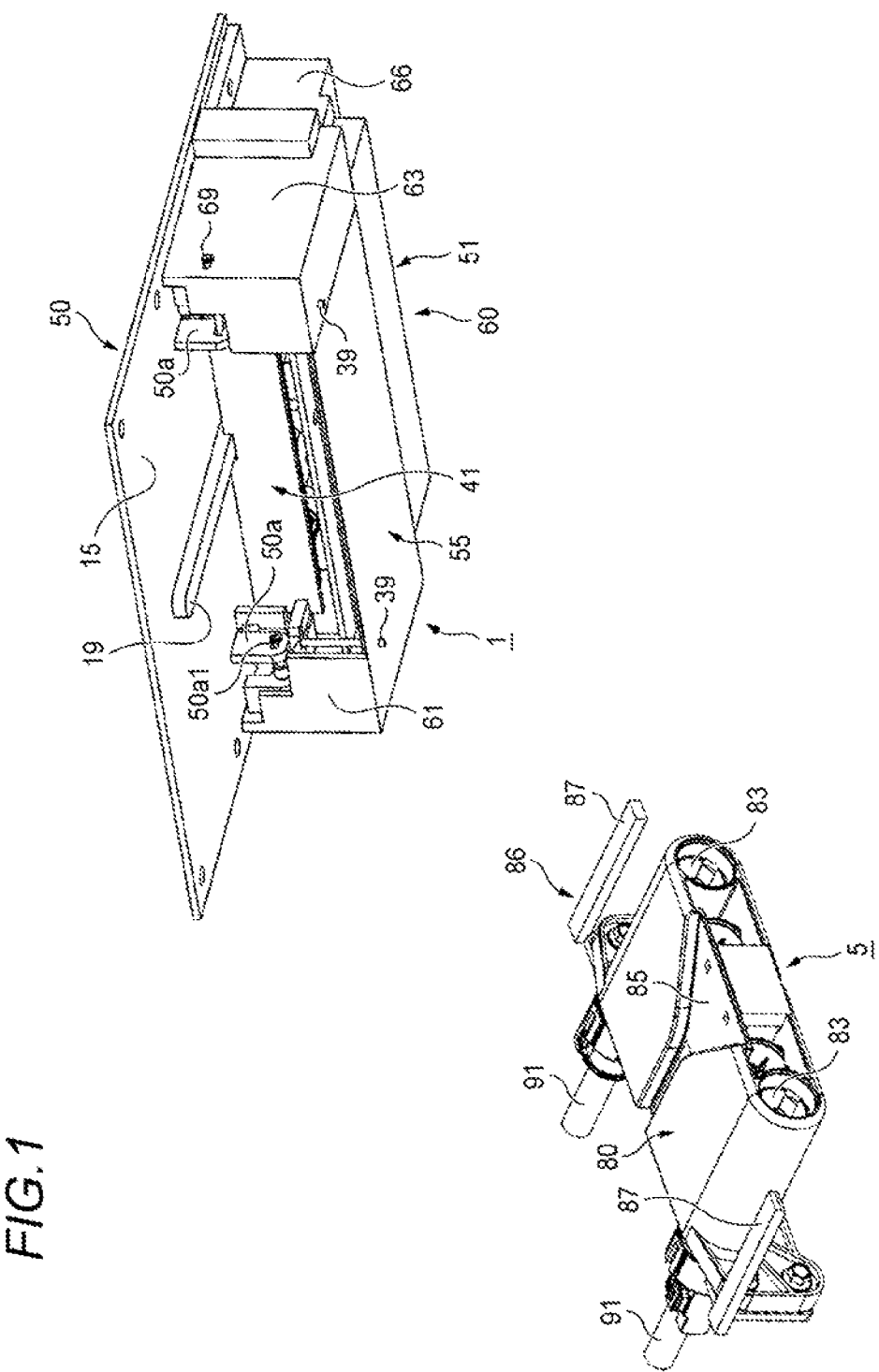
FIG. 1 is a perspective view showing an inlet as a second connector and an inlet plug as a first connector to be fitted to the inlet, which constitute a connector according to an embodiment of the present disclosure.
Figure 2:
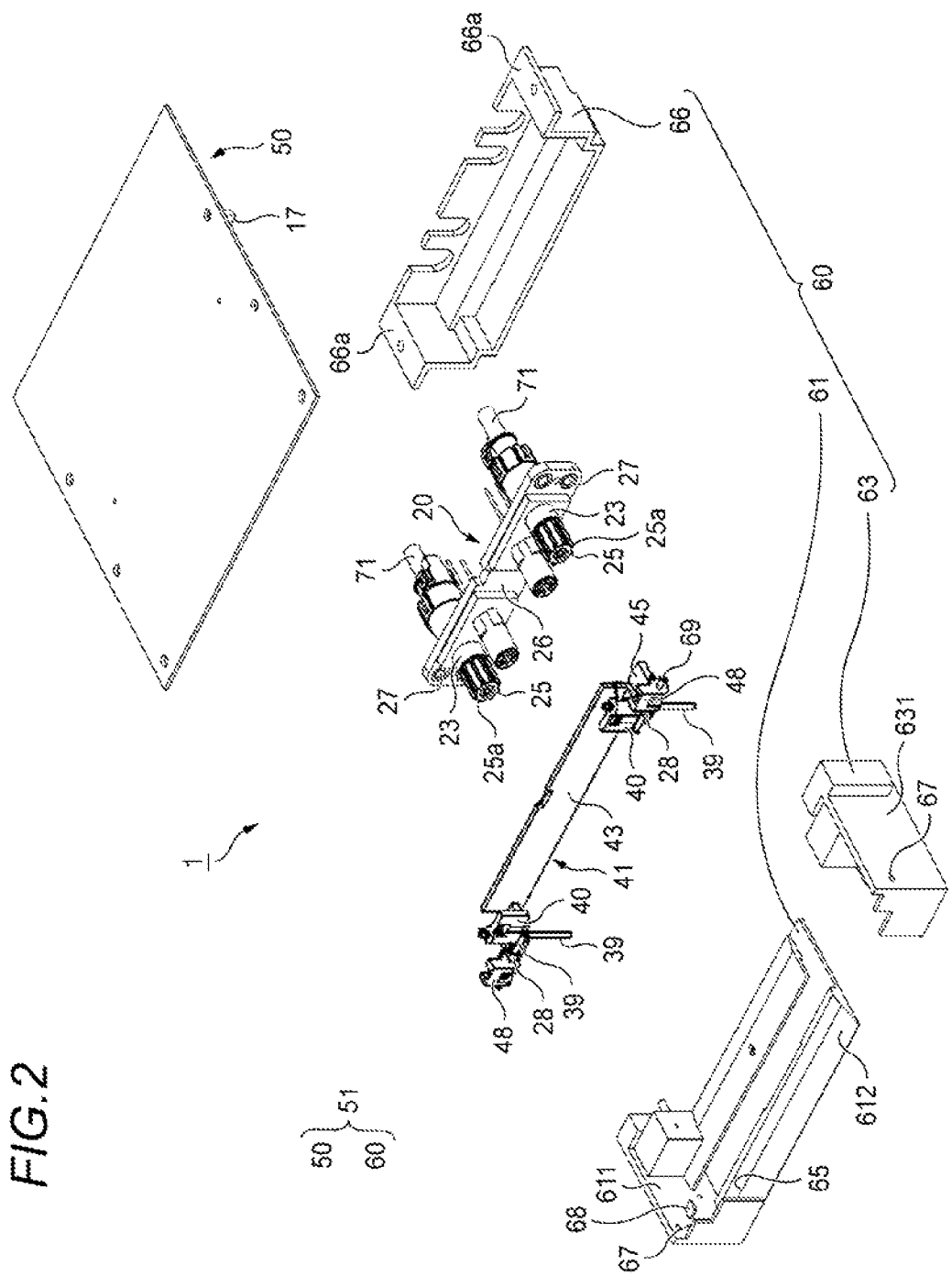
FIG. 2 is an exploded perspective view of the inlet shown in FIG. 1.
Figure 3:
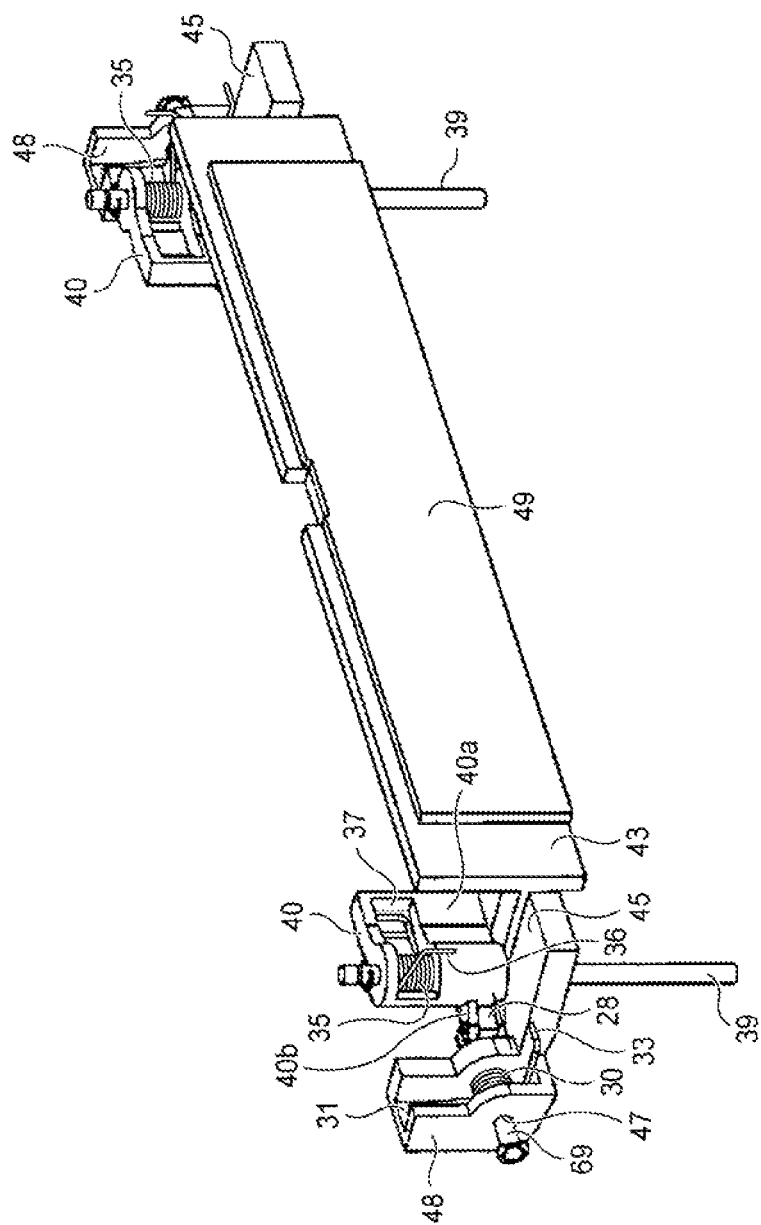
FIG. 3 is a perspective view of a cover shown in FIG. 2 as viewed from the rear side.
Figure 4:
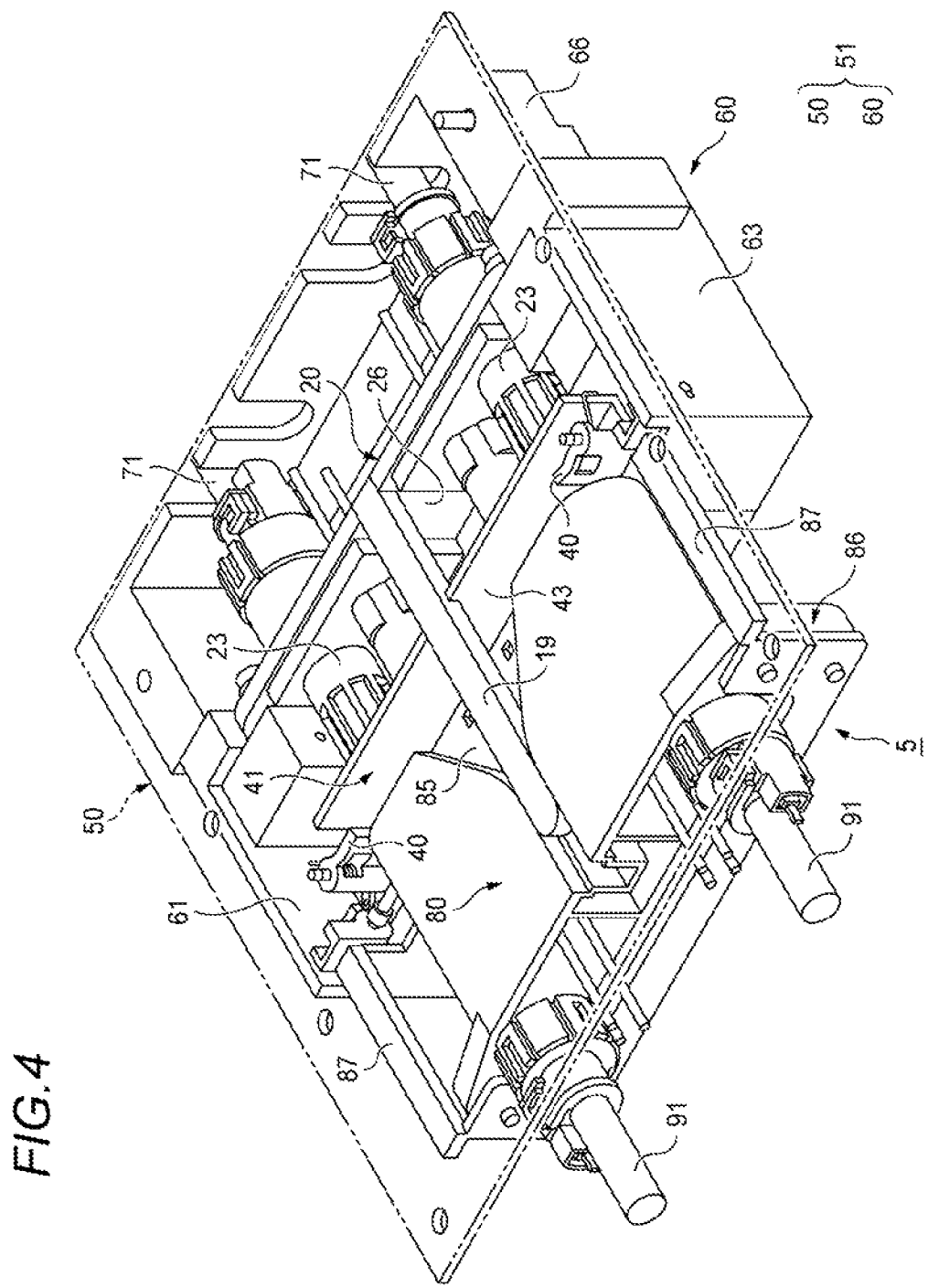
FIG. 4 is a perspective view showing a state immediately after the inlet and the inlet plug shown in FIG. 1 start to be fitted to each other.

FIG. 1 is a perspective view showing an inlet 1 as a second connector and an inlet plug 5 as a first connector to be fitted to the inlet 1, which constitute a connector according to the embodiment of the present disclosure. FIG. 2 is an exploded perspective view of the inlet 1 shown in FIG. 1. FIG. 3 is a perspective view of a cover 41 shown in FIG. 2 as viewed from the rear side. FIG. 4 is a perspective view showing a state immediately after the inlet 1 and the inlet plug 5 shown in FIG. 1 start to be fitted to each other, and shows a state in which a part of an outer case 51 is seen through.

As shown in FIGS. 1, 2, and 4, the inlet 1 as a second connector according to the present embodiment is a cover-mechanism-equipped connector including a housing 20 as a second housing that houses a connection terminal (second connection terminal), the outer case 51 that houses and holds the housing 20, the cover 41 that covers a front surface opening 25 of the housing 20 to which a plug housing 80 (first housing) of the inlet plug 5 as a first connector is fitted, and a slide mechanism that slides a rotation support pin 69 (rotation shaft) of the cover 41 toward the inlet plug 5 side in response to pressing of the plug housing 80.

In the present specification, a front-rear direction is a direction along a connector fitting direction (an upper-lower direction in FIGS. 5, 7, 9, and 11) of the housing 20. A side where the plug housing 80 of the inlet plug 5 is fitted is defined as the front side. The upper-lower direction is a direction (an upper-lower direction in FIGS. 6, 8, 10, and 12), in which the cover 41 opens and closes, orthogonal to the connector fitting direction of the housing 20. A top plate 50 side of the outer case 51 is defined as the upper side.

The housing 20 of the inlet 1 is formed of an electrically insulating synthetic resin. A front wall 26 of the housing 20 is provided with a pair of terminal housing cylinder portions 23, 23 protruding toward the inlet plug 5 side.

A connection terminal connected to a terminal portion of a high-voltage cable 71 is housed in the terminal housing cylinder portion 23. The high-voltage cable 71 connected to the connection terminal is drawn out from a rear end opening of the terminal housing cylinder portion 23.

The front surface opening 25 into which a plug-side connection terminal (first connection terminal) of the inlet plug 5 is inserted is formed at a front end of the terminal housing cylinder portion 23.

The connection terminal is a female terminal formed of a conductive metal material, and is formed in a cylindrical rod shape. A joint hole is formed in a rear end portion of the connection terminal, and a conductor of the high-voltage cable 71 drawn out from the rear end opening of the terminal housing cylinder portion 23 is inserted into the joint hole and is crimped and connected to the joint hole.

In addition, as shown in FIG. 2, on left and right ends of the front wall 26 of the housing 20, screw holes 27 for screw fixing to fixing pieces 17 of the top plate 50 are provided.

As shown in FIG. 2, the outer case 51 is a flat housing formed by a lower case 60 and the top plate 50.

The lower case 60 includes a rear case 66 that houses a part of the terminal housing cylinder portion 23 positioned behind the front wall 26 of the housing 20, and cover support portions 61, 63 that house the front sides of the front wall 26 and the terminal housing cylinder portion 23 and rotatably support the cover 41 to be described later.

The rear case 66 is screwed and fixed to the top plate 50 at flanges 66a, 66a on both left and right sides of the housing 20.

The cover support portions 61, 63 are front cases that are disposed on the front side of the rear case 66 and that are divided into two left and right parts. The cover support portions 61, 63 are respectively formed with support holes 67, 67 in side walls 611, 631 which are disposed on both the left and right sides of the housing 20 and face each other. The support hole 67 is a slide groove that extends in the connector fitting direction and slidably supports the rotation support pin 69, which is the rotation shaft of the cover 41, along the connector fitting direction. The cover support portion 61 has an inclined portion 612 for guiding insertion of the inlet plug 5 into the inlet 1, on a front upper surface of a bottom wall of the cover support portion 61. Rear ends of the cover support portions 61, 63 are screwed and fixed to the front wall 26 of the housing 20 via the fixing pieces 17, 17 of the top plate 50.

In the top plate 50, an eaves portion 15 extends in front of an upper wall portion that defines a housing space together with the lower case 60.

The pair of fixing pieces 17, 17 for screwing and fixing the front wall 26 of the housing 20 and the cover support portions 61, 63 are vertically provided on a lower surface of the upper wall portion. In addition, a shaft support piece 50a is vertically provided on the lower surface of the upper wall portion. The shaft support piece 50a is formed with a through hole 50a1 which is a slide groove extending in the connector fitting direction and slidably supporting the rotation support pin 69 along the connector fitting direction. Further, on a lower surface at a central portion of the eaves portion 15, a pick-up rib 19 for guiding and fitting the plug housing 80 of the inlet plug 5 to the housing 20 housed in the outer case 51 extends along the connector fitting direction.

The cover 41 includes a cover portion 43, cover side walls 45, 45 vertically provided at both end portions of the cover portion 43, and an elastic packing 49 provided on a rear surface of the cover portion 43.

The elastic packing 49 is formed of an elastic member such as a sponge or rubber having a rectangular sheet shape, and is attached to the rear surface of the cover portion 43.

The flat plate-shaped cover portion 43 covers the front surface openings 25 of the pair of terminal housing cylinder portions 23, 23 protruding from the front wall 26 of the housing 20 housed in the outer case 51, respectively, such that the connection terminal can be prevented from being exposed at the front surface openings 25 when the inlet 1 is not connected. On the rear surface of the cover portion 43, the elastic packing 49 can elastically come into contact with opening edges 25a of the front surface openings 25 in the pair of terminal housing cylinder portions 23, 23.

Side end portions on the front side of the cover side wall 45 are provided with through holes 47, 47 formed in facing side walls, and pressed portions 48 extending above the cover side walls 45 from the through holes 47. Between the facing side walls in which the through holes 47, 47 are formed, a torsion coil spring 30 is disposed so as to be penetrated by the rotation support pin 69 between the through holes formed in the shaft support piece 50a of the top plate 50.

The through holes 47, 47 are positioned on extended end sides (opposite sides to the cover portion 43) of the cover side walls 45, 45 vertically provided at both end portions of the cover portion 43. Therefore, the cover 41 is rotatably pivotally supported by the cover support portions 61, 63 via the rotation support pin 69 inserted into the through holes 47, 47 and the through hole 50a1 formed in the shaft support piece 50a of the top plate 50. That is, the rotation support pin 69 extends along the left-right direction of the housing 20, which is a direction intersecting with the connector fitting direction, and rotatably supports the cover portion 43 between a position where the cover portion 43 covers the front surface opening 25 and a position where the cover portion 43 does not cover the front surface opening 25.

The pressed portion 48 is formed by connecting the facing side walls in which the through holes 47, 47 are formed, and has, on a front surface thereof, a facing surface with which a front end of a protruding portion 87, which will be described later, abuts (abuts and comes into contact). The other end portion 31 of the torsion coil spring 30, whose one end portion 33 is hooked on a spring hooking portion 68 (see FIG. 2) of the cover support portion 63, is hooked on a rear surface of the pressed portion 48. Therefore, the cover 41 is elastically biased in a direction to close the front surface opening 25 by a repulsive force of the torsion coil spring 30.

As shown in FIG. 3, the cover 41 further includes lever support pins 39 which are axes extending in a direction intersecting with the rotation support pin 69, levers 40 which are rotation members rotating around the lever support pins 39 in response to pressing of the plug housing 80, and joints 28. The joint 28 is a transmission member that is rotatably connected to the lever 40, is slidably connected to the rotation support pin 69, converts a rotation motion of the lever 40 into a linear motion in the connector fitting direction, and transmits the linear motion to the rotation support pin 69.

The lever 40 is rotatably pivotally supported by the cover support portions 61, 63 and the top plate 50 via the lever support pin 39 inserted into a through hole 65 formed in the bottom wall of the cover support portions 61, 63 and a through hole formed in the top plate 50. The lever support pin 39 is disposed in a slit 45a provided in the cover side wall 45 and extending along the connector fitting direction.

The lever 40 has extension portions 40a, 40b extending from a cylindrical portion into which the lever support pin 39 is inserted.

A front surface of the extension portion 40a serves as a pressing surface to be pressed against a front surface of the plug housing 80 of the inlet plug 5. The lever 40 is rotatably pivotally supported by the lever support pin 39 between a position where the extension portion 40a abuts against the front surface of the plug housing 80 and a position where the extension portion 40a abuts against a side surface of the plug housing 80.

An opening is formed in the lever 40 from the cylindrical portion to the extension portion 40a, and a torsion coil spring 35 is disposed in the opening so as to be penetrated by the lever support pin 39. One end portion 36 of the torsion coil spring 35 is hooked on a spring hooking portion 50b (see FIG. 5) of the top plate 50, and the other end portion 37 is hooked on the extension portion 40a of the lever 40. Therefore, the lever 40 is elastically biased by a repulsive force of the torsion coil spring 35 in a direction in which the lever 40 abuts against the front surface of the plug housing 80 of the inlet plug 5.

The extension portion 40b of the lever 40 is provided with a through hole in the facing wall, and a rotation shaft portion 28a of the joint 28 is inserted through the through hole.

The joint 28 includes a substantially semi cylindrical portion having a through hole, and the rotation shaft portion 28a. The through hole extends in a direction intersecting with the connector fitting direction, and the rotation support pin 69 is inserted through the through hole. That is, the joint 28 is rotatably connected to the lever 40 via the rotation shaft portion 28a, and is slidably connected to the rotation support pin 69 via the through hole of the substantially semi cylindrical portion. With this configuration, the joint 28 converts the rotation motion of the lever 40 into the linear motion in the connector fitting direction and transmits the linear motion to the rotation support pin 69.

The lever 40, the joint 28, and the support holes 67, 67 provided in the cover support portions 61, 63 of the outer case 51 form a slide mechanism that slides the rotation support pin 69 toward the inlet plug 5 side in response to the pressing of the plug housing 80. After the rotation support pin 69 is slid toward the inlet plug 5 side by the slide mechanism, the protruding portion 87 presses the pressed portion 48, such that the cover portion 43 is rotated to the position where the cover portion 43 does not cover the front surface opening 25.

The inlet plug 5 as the first connector according to the present embodiment includes the plug-side connection terminals (first connection terminals) to be fitted to the connection terminals of the inlet 1, the plug housing 80 as the first housing having a pair of terminal housing chambers 83, 83 for housing the plug-side connection terminals, and a bracket 86 having a pair of the protruding portions 87, 87 protruding toward the inlet 1 side along the connector fitting direction (see FIGS. 1 and 4).

The plug housing 80 is formed of an electrically insulating synthetic resin. The bracket 86 having the protruding portions 87, 87 capable of being pressed and biased to face the pressed portion 48 of the cover 41 is attached to the plug housing 80.

A fitting guide groove 85 is formed in an upper surface of the plug housing 80.

The fitting guide groove 85 has a tapered portion whose width increases toward the inlet 1. When the inlet plug 5 is fitted to the inlet 1, the fitting guide groove 85 can guide and fit the plug housing 80 to the housing 20 by engaging with the pick-up rib 19 provided on the top plate 50 of the inlet 1.

The plug-side connection terminal, which is connected to a terminal portion of a high-voltage cable 91, is housed in each terminal housing chamber 83. The high-voltage cable 91 connected to the plug-side connection terminal is drawn out from a rear end opening of each terminal housing chamber 83.

The plug-side connection terminal is a male terminal formed of a conductive metal material, and is formed in a cylindrical rod shape. A joint hole is formed in a rear end portion of the connection terminal 90, and a conductor of the high-voltage cable 91 drawn out from the rear end opening of the terminal housing chamber 83 is inserted into the joint hole and is crimped and connected to the joint hole.

Next, a fitting operation of the inlet 1 and the inlet plug 5 will be described with reference to FIGS. 5 to 12.

Figure 5:
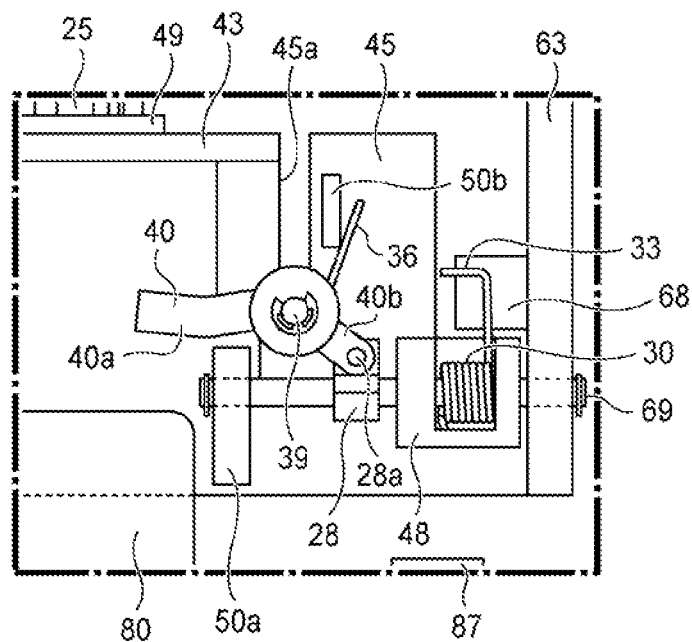
FIG. 5 is an enlarged plan view of a main part showing a state immediately after the inlet and the inlet plug shown in FIG. 4 start to be fitted to each other.
Figure 6:
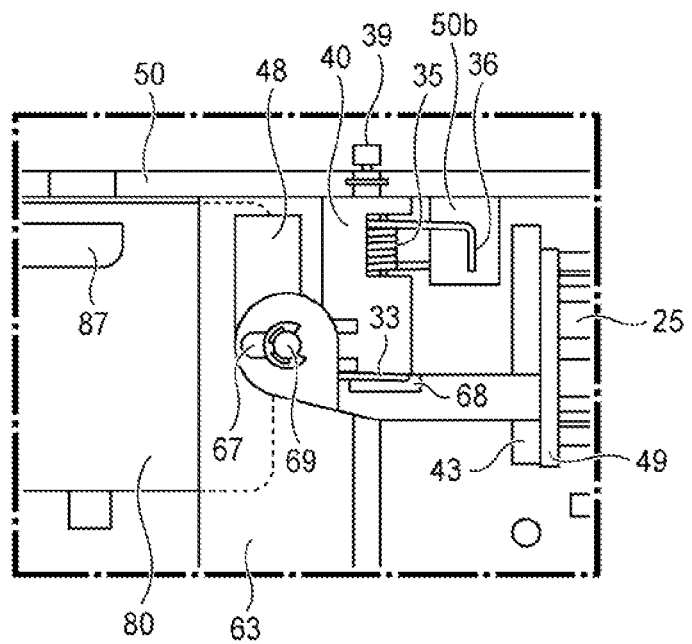
FIG. 6 is an enlarged side view of the main part corresponding to FIG. 5.

As shown in FIGS. 5 and 6, in a state where the inlet 1 and the inlet plug 5 are not fitted to each other, the cover 41 is in a cover closed position where the cover portion 43 covers the front surface opening 25 of the housing 20 by an elastic biasing force of the torsion coil spring 30.

Therefore, the connection terminal of the inlet 1 is not exposed due to the closing of the cover 41. Accordingly, the inlet 1 is subjected to dust prevention and terminal protection, and is prevented from electric shock.

From such a state, insertion and fitting of the inlet plug 5 into the inlet 1 is started. First, from the state shown in FIGS. 5 and 6, the inlet plug 5 is moved to the inlet 1 side, and insertion and fitting of the plug housing 80 into the outer case 51 is started.

Figure 7:
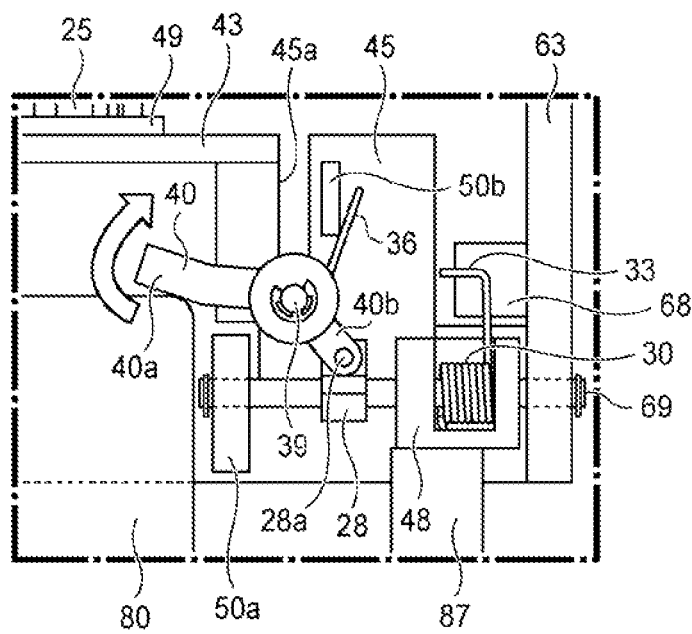
FIG. 7 is an enlarged plan view of a main part showing a state in which a protruding portion is in contact with a pressed portion while the inlet and the inlet plug shown in FIG. 4 are being fitted to each other.
Figure 8:
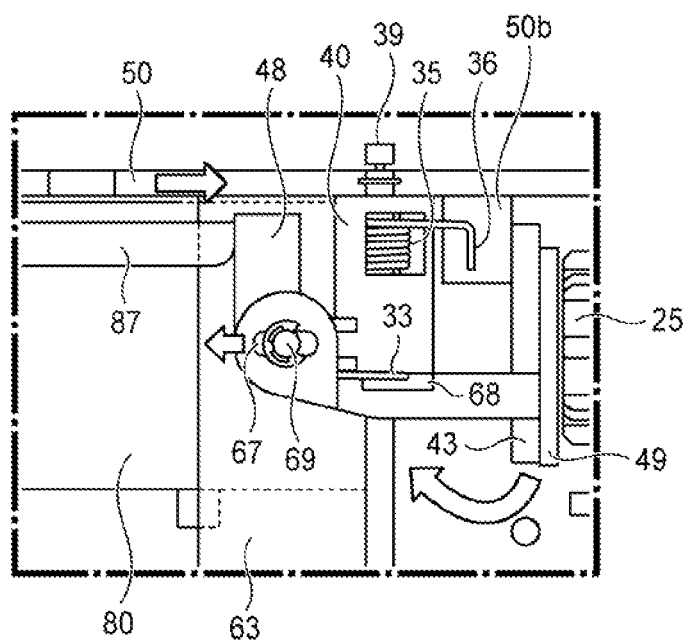
FIG. 8 is an enlarged side view of the main part corresponding to FIG. 7.

At this time, as shown in FIG. 7, the front surface of the plug housing 80 abuts on the pressing surface of the lever 40 and presses the extension portion 40*a* against the elastic biasing force of the torsion coil spring 35. Then, as shown in FIGS. 7 and 8, the rotation support pin 69 is moved rearward via the joint 28 by the rotation of the lever 40. Then, a front end portion of the protruding portion 87 of the bracket 86 of the inlet plug 5 abuts on the pressed portion 48 of the cover 41.

From the state shown in FIGS. 7 and 8, when the inlet plug 5 is deeply inserted into the inlet 1 so as to advance to the rear side of the inlet 1, the front end portion of the protruding portion 87 presses the pressed portion 48 of the cover 41 against the elastic biasing force of the torsion coil spring 30.

Figure 9:
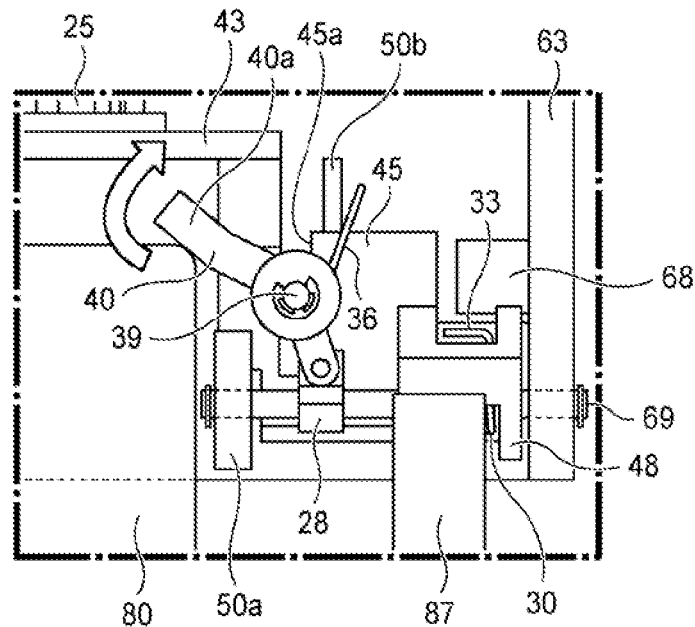
FIG. 9 is an enlarged plan view of a main part showing a state in which a cover portion is rotated while the inlet and the inlet plug shown in FIG. 4 are being fitted to each other.
Figure 10:
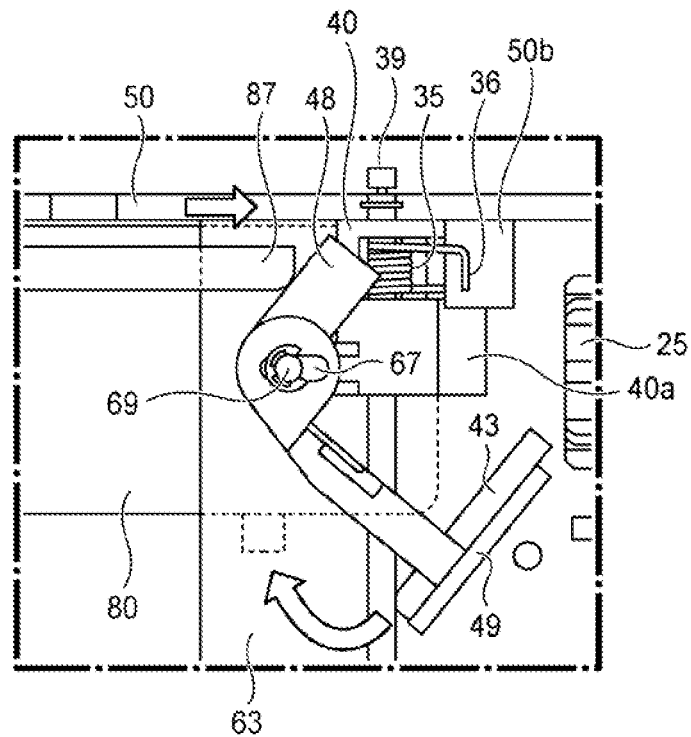
FIG. 10 is an enlarged side view of the main part corresponding to FIG. 9.

Then, as shown in FIGS. 9 and 10, the cover portion 43 is rotated downward with the rotation support pin 69 as a rotation center.

Here, after the rotation support pin 69 is slid toward the inlet plug 5 side and the cover portion 43 is separated from the opening edge 25*a* of the front surface opening 25, the cover portion 43 is rotated. Therefore, when the cover 41 is opened and closed, for the cover portion 43, rubbing between the opening edge 25*a* of the front surface opening 25 and the cover portion 43 is prevented.

Figure 11:
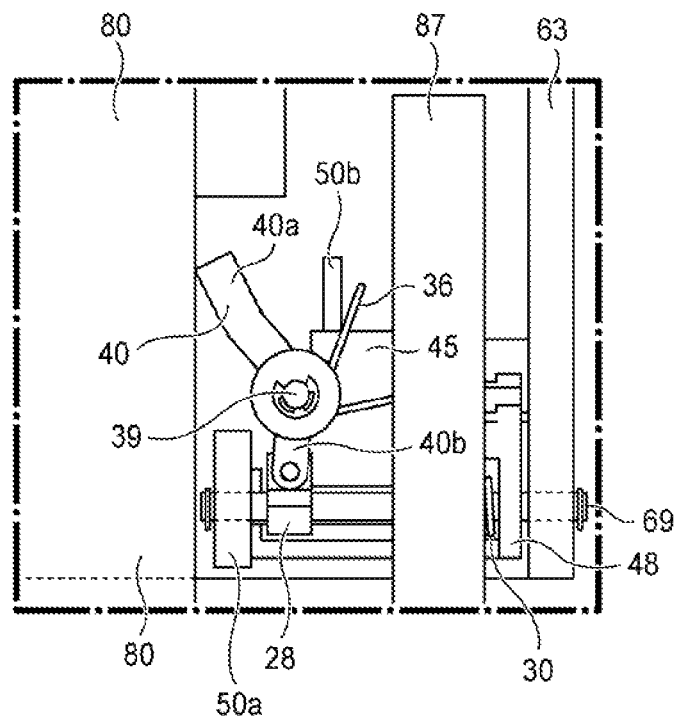
FIG. 11 is an enlarged plan view of a main part showing a state in which the inlet and the inlet plug shown in FIG. 4 are completely fitted to each other.
Figure 12:
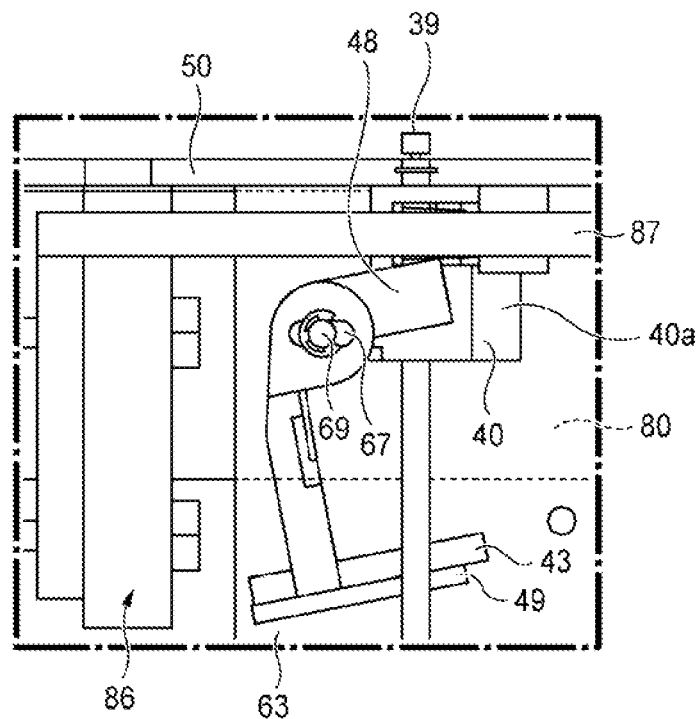
FIG. 12 is an enlarged side view of the main part corresponding to FIG. 11.

When the inlet plug 5 is further deeply inserted into the inlet 1 so as to advance to the rear side of the inlet 1 from the state shown in FIGS. 9 and 10, as shown in FIGS. 11 and 12, the cover 41 is rotated to a cover open position where the cover portion 43 does not cover the front surface opening 25. Then, the plug-side connection terminal of the inlet plug 5 is fitted and connected to the connection terminal of the inlet 1, and accordingly, the high-voltage cable 71 and the high-voltage cable 91 are electrically connected to each other.

Therefore, the housing 20 of the inlet 1 and the plug housing 80 of the inlet plug 5 are fitted and electrically connected to each other by bringing the front end portion of the protruding portion 87 on the bracket 86 and the pressed portion 48 of the cover 41 into contact with each other.

As described above, according to the inlet 1 of the present embodiment, the elastic packing 49 provided on the cover portion 43 can be brought into elastic contact with the opening edge 25*a* of the front surface opening 25. Therefore, the elastic packing 49 that contacts the opening edge 25*a* and covers the front surface opening 25 can more reliably prevent dust, water, and the like from entering the front surface opening 25 of the housing 20.

According to the inlet 1 and the inlet plug 5 forming the connector of the present embodiment described above, it is possible to provide a connector that prevents wear of the housing 20 and the cover 41 in the inlet 1.

The present disclosure is not limited to the embodiment described above, and modifications, improvements, and the like can be made as appropriate. In addition, materials, shapes, dimensions, numbers, arrangement positions, and the like of each constituent element in the embodiment described above are optional and not limited as long as the object of the present disclosure can be achieved.

For example, in the above embodiment, although an inlet used for an electric vehicle and the like as a cover-mechanism-equipped connector has been described as an example, the connector of the present disclosure is not limited thereto, and can be applied to various connectors based on a gist of the present disclosure.

In addition, in the above embodiment, the cover 41 is rotated downward with the rotation axis extending in the left-right direction of the inlet 1 as a rotation center, but the cover 41 may be rotated upward. In addition, the cover may be configured to rotate laterally with the rotation axis extending in the upper-lower direction of the inlet as the rotation center. That is, a rotation direction of the cover with respect to the inlet is appropriately set according to the attachment direction of the inlet when the vehicle body is attached.

Further, in the above embodiment, the slide mechanism that slides the rotation support pin 69 toward the inlet plug 5 side in response to the pressing of the plug housing 80 is formed by the support hole 67 which is the slide groove, the lever 40 which is the rotation member, and the joint 28 which is the transmission member. However, the slide mechanism is not limited to this configuration, and may be a mechanism that slides the rotation support pin 69, which rotatably supports the cover portion 43, toward the inlet plug 5 side in response to the pressing of the plug housing 80.

According to a first aspect of the present disclosure, a connector includes: a first connector (inlet plug 5); and a second connector (inlet 1), in which the first connector (5) and the second connector (1) are fitted and electrically connected to each other. The first connector (5) includes: a first housing (plug housing 80) that houses a first connection terminal; and a protruding portion (87) that protrudes from the first housing (80) toward the second connector (1) along a connector fitting direction. The second connector (1) includes: a second housing (outer case 51) that houses a second connection terminal and has a front surface opening (25) to which the first connector (5) is fitted; a cover (41) including a cover portion (43) that covers the front surface opening (25), a rotation shaft (rotation support pin 69) that rotatably supports the cover portion (43) between a position where the cover portion (43) covers the front surface opening (25) and a position where the cover portion (43) does not cover the front surface opening (25), and an abutted portion (pressed portion 48) with which the protruding portion (87) abuts; and a slide mechanism (support hole 67, through hole 50*a*1, lever 40, joint 28) that slides the rotation shaft (69) toward the first connector (5) in response to pressing the first housing (80) to the second housing (51). After the rotation shaft (69) is slid toward the first connector (5) with the slide mechanism (67, 50*a*1, 40, 28), the protruding portion (87) presses the abutted portion (48) such that the cover portion (43) is rotated to the position where the cover portion (43) does not cover the front surface opening (25).

According to the connector having the configuration of the first aspect, the front surface opening of the second housing in the second connector is covered by the cover in which the cover portion is in contact with the opening edge. Therefore, it is possible to reliably prevent dust, water, and the like from entering the front surface opening of the second housing.

Then, when the first connector and the second connector are fitted to each other, the slide mechanism slides the rotation shaft toward the first connector side in response to the pressing of the first housing. Thereafter, when the protruding portion presses the pressed portion of the cover, the cover can be rotated from the position (cover closed position) where the cover portion covers the front surface opening of the second housing to the position (cover open position) where the cover portion does not cover the front surface opening of the second housing. Therefore, when the cover is opened and closed, for the cover portion, rubbing between the opening edge of the front surface opening and the cover portion is reduced.

According to a second aspect of the present disclosure, the slide mechanism (67, 50a1, 40, 28) may include: a slide groove (67, 50a1) that is provided in the second housing (51), extends in the connector fitting direction, and slidably supports the rotation shaft (69) along the connector fitting direction; a rotation member (40) that rotates around an axis (lever support pin 39) extending in a direction intersecting with the rotation shaft (69) in response to pressing the first housing (80) to the second housing (51); and a transmission member (28) that is rotatably connected to the rotation member (40), is slidably connected to the rotation shaft (69), and converts a rotation motion of the rotation member (40) to a linear motion in the connector fitting direction to transmit the linear motion to the rotation shaft (69).

According to the connector having the configuration of the second aspect, the rotation member rotates around the axis in response to the pressing of the first housing. The rotation motion is converted into the linear motion in the connector fitting direction by the transmission member and transmitted to the rotation shaft, whereby the rotation shaft is moved to the first connector side along the slide groove. Accordingly, the slide mechanism is specifically implemented.

According to a third aspect of the present disclosure, the cover portion (43) may include an elastic packing (49) that elastically contacts with an opening edge (25a) of the front surface opening (25).

According to the connector having the configuration of the third aspect, the elastic packing provided on the cover portion can elastically contact with the opening edge of the front surface opening. Therefore, the elastic packing that comes into contact with the opening edge and covers the front surface opening can more reliably prevent dust, water, and the like from entering the front surface opening of the second housing. In addition, according to this configuration, even when the elastic packing provided on the cover portion elastically contacts with the opening edge of the front surface opening, the cover portion is rotated after the rotation shaft is slid toward the first connector side, such that rubbing between the elastic packing and the second housing can be prevented.

According to the present disclosure, it is possible to provide a connector that prevents wear of a housing and a cover in a cover-mechanism-equipped connector.

What is claimed is:

1. A connector comprising:
a first connector; and
a second connector, wherein
the first connector and the second connector are fitted and electrically connected to each other,
the first connector includes:
  a first housing that houses a first connection terminal; and
  a protruding portion that protrudes from the first housing toward the second connector along a connector fitting direction,
the second connector includes:
  a second housing that houses a second connection terminal and has a front surface opening to which the first connector is fitted;
  a cover including a cover portion that covers the front surface opening, a rotation shaft that rotatably supports the cover portion between a position where the cover portion covers the front surface opening and a position where the cover portion does not cover the front surface opening, and an abutted portion with which the protruding portion abuts; and
  a slide mechanism that slides the rotation shaft with respect to the second housing toward the first connector in response to pressing the first housing to the second housing, and
after the rotation shaft is slid toward the first connector with the slide mechanism, the protruding portion presses the abutted portion such that the cover portion is rotated to the position where the cover portion does not cover the front surface opening.

2. The connector according to claim 1, wherein
the slide mechanism includes:
  a slide groove that is provided in the second housing, extends in the connector fitting direction, and slidably supports the rotation shaft along the connector fitting direction;
  a rotation member that rotates around an axis extending in a direction intersecting with the rotation shaft in response to pressing the first housing to the second housing; and
  a transmission member that is rotatably connected to the rotation member, is slidably connected to the rotation shaft, and converts a rotation motion of the rotation member to a linear motion in the connector fitting direction to transmit the linear motion to the rotation shaft.

3. The connector according to claim 1, wherein
the cover portion includes an elastic packing that elastically contacts with an opening edge of the front surface opening.

* * * * *